Sept. 28, 1965 R. EMEIS 3,208,889
METHOD FOR PRODUCING A HIGHLY DOPED p-TYPE CONDUCTANCE REGION IN A SEMICONDUCTOR BODY, PARTICULARLY OF SILICON AND PRODUCT THEREOF
Filed May 22, 1963
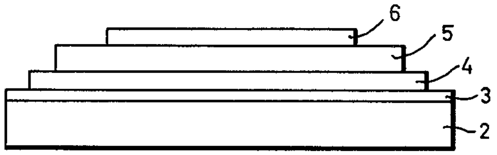

United States Patent Office 3,208,889

Patented Sept. 28, 1965

3,208,889
METHOD FOR PRODUCING A HIGHLY DOPED p-TYPE CONDUCTANCE REGION IN A SEMICONDUCTOR BODY, PARTICULARLY OF SILICON AND PRODUCT THEREOF

Reimer Emeis, Ebermannstadt, Germany, assignor to Siemens-Schuckertwerke Aktiengesellschaft, Berlin, Germany, a corporation of Germany Filed May 22, 1963, Ser. No. 282,267
Claims priority, application Germany, May 29, 1962, S 79,661
8 Claims. (Cl. 148—177)

My invention relates to electronic semiconductor devices. The semiconductor materials used for their production are silicon, germanium, silicon-carbide, intermetallic semiconductor compounds of respective elements from the third and fifth groups, and semiconductor compounds of respective elements from the second and sixth groups of the Periodic System. Regions of different conductance types and p-n junctions are obtained in a body of such a material by doping, for instance by way of diffusion or alloying processes.

For producing a highly doped p-type region in a semiconductor body it is known to place the semiconductor body in surface contact with aluminum and to heat the assembly to a temperature above the eutectic temperature of the aluminum-semiconductor material (German Patent No. 1,046,198).

My invention, in a more particular aspect, relates to a method of the kind just-mentioned and has for its object to afford the production of crystallographically and electronically superior semiconductor devices as compared with those resulting from the known process.

According to my invention I heat the semiconductor body in contact with aluminum to produce an aluminum-semiconductor alloy on the surface of the body, and I add nickel to that alloy. As a rule, the amount of nickel thus added is 0.5 to 5%, preferably about 2%, by weight relative to that of the amount of aluminum.

It has been found that the alloying front in an aluminum-semiconductor alloy thus produced is affected by considerably fewer imperfections than in an otherwise similar alloy without the nickel addition.

The invention will be described more in detail with reference to embodiments including the one illustrated, by way of example, on the accompanying drawing which shows a lateral view of a circular silicon diode.

The nickel addition may be admixed to the aluminum before the aluminum is alloyed to the semiconductor body. Consequently, one way of proceeding is to prepare in a suitable crucible an aluminum-nickel alloy having the above-mentioned nickel content of 0.5 to 5% by weight, the remainder being substantially all aluminum. The ingot is then rolled out to suitable foils. Pieces of material punched out of the foils and which may be given any desired electrode shape, are placed upon a semiconductor body consisting, for instance, of a silicon disc. The whole assembly is then heated, for example in an electrically heated furnace, to a temperature above the eutectic temperature of aluminum and silicon.

In the alloying process, some of the aluminum dissolves in the silicon, and vice versa, and when the eutectic composition is reached, melting takes place at the contacting area, whereafter all of the aluminum is dissolved. The entire assembly is then heated to a temperature approximately 200° C. above the eutectic temperature of the aluminum-silicon composition. During the subsequent cooling, the melt initially recedes, and aluminum atoms are built into the resolidifying silicon and form a highly doped p-type region. Subsequently the remainder of the melt also solidifies when the eutectic temperature is reached again. The silicon-aluminum eutectic constitutes a metallic electrode superimposed upon the highly doped p-type region.

For investigation, the eutectic electrode can be removed, for instance with the aid of hydrochloric acid, thus exposing the p-type region. It has been found that, when adding nickel according to the invention, the surface of the exposed region is considerably more even and smoother than without this addition under otherwise the same conditions. Since one of the essential requirements in semiconductor techniques is the observance of predetermined tolerances, such levelling of the alloying front constitutes a substantial improvement.

Another way of applying the invention, not requiring the preparation of an aluminum-nickel pre-alloy, is to introduce a nickel addition into the alloy formed of aluminum and semiconductor material. An embodiment of this kind will be described presently with reference to the silicon rectifier diode shown on the drawing.

A circular molybdenum disc 2, for instance of 2 mm. thickness and 20 mm. diameter, has one of its flat faces coated with nickel layer 3 of approximately 0.1 to 1 micron thickness. The nickel coat may be applied by electroplating or vapor deposition. An aluminum foil 4 of 19 mm. diameter is placed upon the nickel layer. The foil may have a thickness of 60 microns. If desired, doping additions, for instance boron (In,Ga) may be admixed to the aluminum. A circular wafer 5 of p-type silicon having 300 microns thickness and a diameter of 18 mm. is placed upon the aluminum foil 4. A foil consisting of gold-antimony alloy (approx. 0.5% Sb 95.5% Au) about 15 mm. in diameter and 80 microns thickness is placed on top of the silicon wafer.

Then the enitre assembly, preferably embedded in a powder substance, such as graphite, that will not react with the assembly components, is heated to approximately 800° C. in an electric resistance furnace. At this temperature an aluminum-silicon alloy will form, into which the nickel penetrates, thus creating the improved alloying front. A gold-silicon alloy of eutectic composition is formed on the other face of the silicon body. This gold-silicon alloy is preceded, in the direction toward the interior of the semiconductor body, by an antimony-doped n-type re-crystallization region. After the alloying step has been completed, the whole assembly forms an integral rectifier diode to which the molybdenum disc 2 imparts great mechanical stability. The diode has a p-n junction between the Sb-doped n-type region and the main p-type portion of the silicon that remained unaffected by the alloy-doping; and the aluminum-silicon electrode alloyed to the opposite face of the wafer forms an ohmic junction. The diodes thus produced exhibit improved accuracy and uniformity not only in each product but also among many diodes made in large-scale production.

The main reason for these improvements becomes manifest when removing the silicon from one of the diodes by means of an etching solution composed of nitric acid and hydrofluoric acid, preferably after the gold electrode has been removed by means of aqua regia. There remains the molybdenum disc 2 with the aluminum-silicon euectic. The eutectic thus laid bare exhibits an almost mirror-like brilliance and a perfectly planar surface, these being indicative of the advantageous effects of the nickel addition.

Another advantage of adding nickel is the fact that it acts as a getter substance on the semiconductor surface relative to various foreign substances, such as heavy metals, which may reach the surface of the semiconductor body during subsequent fabrication or during electric operation of the semiconductor device, and which might otherwise diffuse into the semiconductor body when heated.

While the above-described embodiment relates to p-type electrodes on silicon, the invention is applicable in the same manner to other semiconductors of fourth-group elements (Ge, SiC), and with suitable dopant addition to the aluminum also on bodies of GaAs, InSb, InAs and other semiconductor compounds to form thereupon an electrode and an adjacent doped semiconductor region of modified conductance.

I claim:

1. The method of producing a highly doped conductance region in a semiconductor body, which comprises contacting the semiconductor body with an elemental aluminum foil, heating the semiconductor body together with the aluminum to a temperature above the eutectic temperature of the aluminum-semiconductor alloy, and adding an amount of nickel from 0.5 to 5.0% by weight to the aluminum-semiconductor alloy prior to cooling.

2. The method of producing a highly doped p-type region in a semiconductor body of third-group semiconductor material, which comprises placing an elemental aluminum foil in contact with a surface of the semiconductor body, heating both to a temperature above the eutectic temperature of the aluminum-semiconductor alloy and adding to the alloy prior to cooling an amount of nickel from 0.5 to 5% by weight relative to the aluminum.

3. The method of producing a highly doped p-type region in a semiconductor body of silicon, which comprises placing an elemental aluminum foil in contact with a surface of the silicon body, heating both to a temperature above the eutectic temperature of the aluminum-semiconductor alloy, and adding nickel to the alloy prior to cooling in an amount of about 2% by weight relative to the aluminum.

4. The method of producing a highly doped p-type region in a semiconductor body, which comprises preparing a foil of an aluminum-nickel alloy containing 0.5 to 5% by weight of nickel and a remainder substantially of aluminum, placing the foil into face-to-face contact with the semiconductor body and heating both conjointly to a temperature above the eutectic temperature of the aluminum-semiconductor alloy.

5. The method of producing a highly doped p-type region in a semiconductor body, which comprises coating a refractory metal body with nickel to an amount of nickel of 0.5 to 5.0% by weight, placing an elemental aluminum foil in area contact with the nickel coating and the semiconductor body in area contact with the foil, and then heating the entire assembly to a temperature above the melting point of the aluminum-semiconductor eutectic, said metal body having a melting point higher than said temperature.

6. The method of producing a highly doped p-type region in a semiconductor body of silicon, which comprises coating a plate of molybdenum with nickel, placing an elemental aluminum foil between the nickel coating and the silicon body in the area contact with both, and heating the entire assembly to approximately 800° C.

7. A semiconductor device comprising a semiconductor body having electrode layers alloyed to said body, one of said electrode layers consisting substantially of an aluminum-semiconductor alloy which contains nickel in an amount of 0.5 to 5% by weight, and said semiconductor body having adjacent to said alloy layer an aluminum-doped region.

8. A semiconductor device comprising a semiconductor body of silicon having electrode layers alloy-bonded to said body, one of said electrode layers consisting substantially of an aluminum-silicon alloy which contains nickel in an amount of 0.5 to 5% by weight, and said semiconductor body having adjacent to said alloy layer an aluminum-doped p-type region.

References Cited by the Examiner

UNITED STATES PATENTS

| | | | |
|---|---|---|---|
| 3,087,100 | 4/63 | Savadelis | 148—178 |

FOREIGN PATENTS

| | | |
|---|---|---|
| 754,404 | 8/56 | Great Britain. |
| 865,471 | 4/61 | Great Britain. |

DAVID L. RECK, *Primary Examiner.*

HYLAND BIZOT, *Examiner.*